May 3, 1927.
E. A. KERSTEIN
RESETTING DEVICE FOR GAS METERS
Filed April 25, 1925
1,627,183
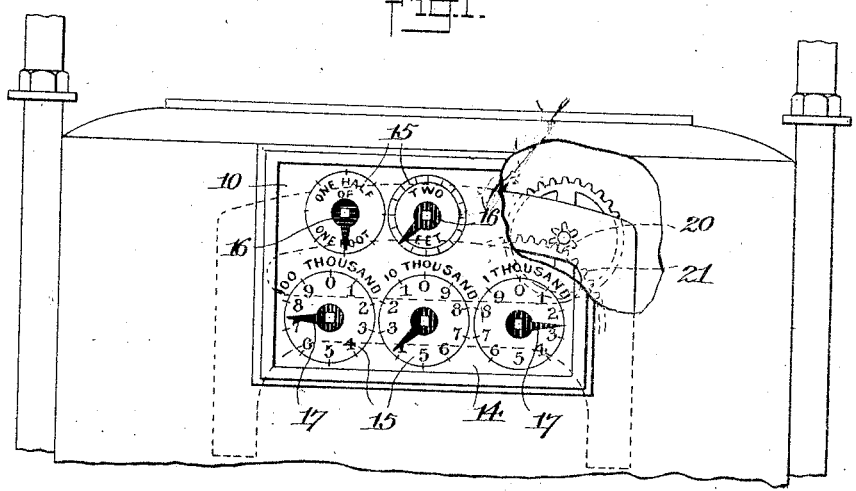
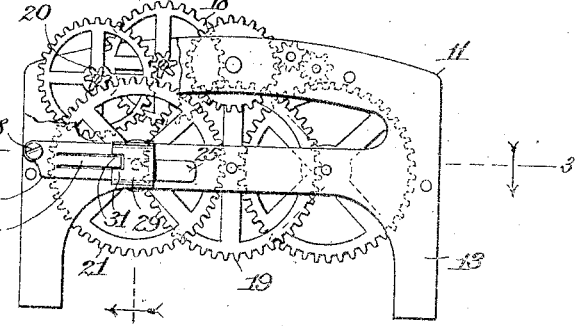
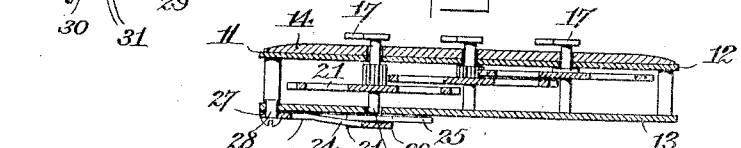
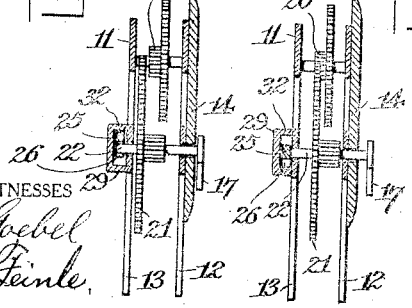
WITNESSES
INVENTOR
Ernest A. Kerstein.
BY
ATTORNEYS Patented May 3, 1927.

1,627,183

UNITED STATES PATENT OFFICE.

ERNEST A. KERSTEIN, OF BROOKLYN, NEW YORK, ASSIGNOR TO AMERICAN METER COMPANY, INCORPORATED, OF NEW YORK, N. Y., A CORPORATION OF DELAWARE.

RESETTING DEVICE FOR GAS METERS.

Application filed April 25, 1925. Serial No. 25,936.

This invention relates to the class of registering and indicating mechanisms or instrumentalities, and has especial reference to means or devices for resetting the pointers of such mechanisms or instrumentalities to initial or zero positions, respectively.

One of the principal objects of the present invention is the provision of means for quickly and easily resetting the pointers forming parts of a meter to initial or zero positions, respectively.

Another object of the invention is the provision of a means or device as characterized, which is especially adapted for use in conjunction with a standard type of meter without requiring any material alteration of the meter.

Another object of the invention is the production of a device which is readily applicable for use in conjunction with an operating part of a meter, such as a toothed wheel or gear of one set of toothed wheels or gears, to render the set of toothed wheels or gears independently operable of another set of toothed wheels or gears with which the former set of toothed wheels or gears coact in the indicating operation.

With the foregoing, other objects of the invention will appear from the embodiment of the invention which, by way of example, is described in the following specification and illustrated in the accompanying drawing, in which:

Figure 1 is a front elevation of a standard type of meter such as is used for measuring the quantity of fluid, such as gas, which passes through the same, a portion of the casing of the meter being shown, and a portion of said casing being broken away to show the interior portion of the register or indicator of the meter;

Fig. 2 is a rear view of the register or indicator itself, with a portion of the frame thereof broken away to show more clearly the manner in which motion is transmitted from one set of toothed wheels or gears to the other set of toothed wheels or gears;

Fig. 3 is a horizontal sectional view taken on the line 3—3 of Fig. 2 and looking in the direction indicated by the arrow;

Fig. 4 is a vertical sectional view taken on the line 4—4 of Fig. 2 and looking in the direction of the arrow, and showing the disposition of the shiftable toothed wheel or gear which permits the register or indicator to operate in the ordinary manner;

Fig. 5 is a view similar to Fig. 4 and showing the disposition of the shiftable toothed wheel or gear which permits the quick and easy resetting of the pointers of the register or indicator;

Fig. 6 is an elevation of the control part forming a part of the present invention;

Fig. 7 is a detail view of the retainer.

In the type of register or indicator with which the present invention is utilized, two sets of toothed wheels or gears are employed for moving the several pointers which move with respect to dials, and in which the pointer related to one dial is moved at a certain greater number of revolutions as compared to the lesser number of revolutions of the other pointers. Owing to the proportions of the toothed wheels or gears, the prime mover of the gears will have rotated many revolutions as compared to the number of revolutions of the last gear to which movement is transmitted. To reset the pointers to their initial or zero positions by reversing the operation of the gears through the movement of the prime gear, would require considerable time. In order to overcome such objection, means hereinafter fully described is employed for quickly and easily resetting the pointers to their initial or zero positions.

Referring now more particularly to the several views of the drawing, it will be apparent that there is shown a register or indicator 10, which is of a standard type, such as commonly employed as a part of a gas meter to indicate the quantity of gas which flows through the meter. The said register or indicator 10 includes a frame 11 consisting of parts 12 and 13 held in spaced relationship in any approved manner. The part 12 of the frame carries a plate 14 having dials 15 thereon in respect to which pointers 16 and 17 move or rotate in the indicating operation. The pointers 16 are moved by a set of toothed wheels or gears 18 and the pointers 17 are moved by a set of toothed wheels or gears 19, one set of toothed wheels coacting with the other set by virtue of the possible meshing engagement of the pinion 20 of the set of toothed wheels 18 with the toothed wheel 21 of the set of toothed wheels 19. In order that the toothed wheel 21 may be moved into and out of meshing engagement with the pinion 20, provision is made so that the shaft 22 on which the toothed wheel 21 is mounted, may have axial movement as well as rotary movement, and means is also provided for holding the shaft 22 in different positions in each of which sliding movement is prevented but in which positions the shaft 22 will have rotary movement. The said means includes a part 23 shown most clearly in Fig. 6, which is formed from a single piece of material and includes a spring member 24 which is offset and has a portion thereof disposed out of the plane of the remaining portions of the part 23. The part 23 also includes a finger-piece 25 for manipulating the part 23. The part 23 is cut out, as at 26, for a purpose to appear, and has a hole 27 for the reception of a suitable fastening element, such as the screw 28, for effecting the pivotal connection of the part 23, as shown more clearly in Figs. 2 and 3. The part 23 is movable with respect to a retainer 29, attached to or suitably formed on the part 13 of the frame 11. The retainer 29 is cut out, as at 30, to provide abutments 31, with which the extremity of the spring member 24 coacts in one position of the part 23. With the part 23 in the position shown in Figs. 2, 3 and 4, the extremity of the member 24 will be disposed between the abutments 31, and, therefore, the part 23 will be held against movement, while one end of the shaft 22 is in contact with the finger-piece 25. Under this arrangement, the toothed wheel 21 is in mesh with the pinion 20, the register or indicator 10 operating in the usual manner.

The register or indicator continues to operate in the usual manner until it becomes necessary to reset the same by moving all of the pointers 16 and 17 back to their initial or zero positions respectively. To do this in the ordinary manner would require considerable time, and to overcome this it is but necessary, in accordance with the present invention, to simply flex the spring member 24 to disengage the extremity thereof from the abutments 31, whereupon the part 23 may be moved on its pivot by manipulation of the finger-piece 25, and as a result the finger-piece 25 will be moved clear of the shaft 22. It follows that the shaft may be slid to the position shown in Fig. 5, in which the toothed wheel 21 will be out of mesh with the pinion 20. Under this arrangement the set of toothed wheels or gears 19 may be operated independently of the other set 18, therefore permitting the pointers 17 to be easily and quickly brought to their initial or zero positions respectively. The pointers 16 are then set to their initial or zero positions, whereupon the toothed wheel 21 is moved to a position in which it will again mesh with the pinion 20, and the part 23 is moved on its pivot, causing the extremity of the spring member to spring between the abutments 31 and place the finger-piece 25 in line with the shaft 22. The register or indicator is again placed in condition to operate in the usual manner. The retainer 29 limits the pivotal movement of the part 23 by the portions 32. The retainer 29 is also cut out, as at 33, to permit a portion of the part 23 to move therein.

It is to be understood that the invention is not restricted to the precise arrangement of parts shown and described, as details of construction may be modified and rearranged without departing from the spirit of the invention, the scope of which is limited only by the terms of the appended claim.

What is claimed is:

A resetting device comprising a part capable of being pivotally mounted, said part having a flexible member and a finger-piece and being cut away; and a retainer with respect to which said part is movable, said retainer having abutments with which the extremity of said flexible member is adapted to coact to prevent the movement of said part with respect to said retainer.

ERNEST A. KERSTEIN.